(12) United States Patent
Wetzel et al.

(10) Patent No.: US 11,821,767 B2
(45) Date of Patent: Nov. 21, 2023

(54) METHOD FOR DETERMINING THE TIME OF FLIGHT OF AN ULTRASOUND SIGNAL IN A FLOWING MEDIUM AND ULTRASONIC FLOW METER

(71) Applicant: DIEHL METERING GMBH, Ansbach (DE)

(72) Inventors: Marcus Wetzel, Ansbach (DE); Ulrich Gaugler, Weidenbach (DE)

(73) Assignee: Diehl Metering GmbH, Ansbach (DE)

( * ) Notice: Subject to any disclaimer, the term of this patent is extended or adjusted under 35 U.S.C. 154(b) by 981 days.

(21) Appl. No.: 16/208,013

(22) Filed: Dec. 3, 2018

(65) Prior Publication Data

US 2019/0170549 A1  Jun. 6, 2019

(30) Foreign Application Priority Data

Dec. 1, 2017  (DE) .................... DE102107011145.6
Dec. 21, 2017 (DE) .................... DE102017011861.2

(51) Int. Cl.
*G01F 1/66* (2022.01)
*G01N 29/024* (2006.01)
*G01N 29/22* (2006.01)
*G01F 1/667* (2022.01)

(52) U.S. Cl.
CPC ............... *G01F 1/66* (2013.01); *G01F 1/667* (2013.01); *G01N 29/024* (2013.01); *G01N 29/222* (2013.01)

(58) Field of Classification Search
None
See application file for complete search history.

(56) References Cited

U.S. PATENT DOCUMENTS

| | | | | |
|---|---|---|---|---|
| 3,894,431 A * | 7/1975 | Muston | ................... | G01F 1/667 73/861.29 |
| 5,178,018 A * | 1/1993 | Gill | ......................... | G01P 5/247 73/861.28 |
| 5,600,073 A * | 2/1997 | Hill | .......................... | G01B 5/28 73/30.03 |
| 6,062,091 A * | 5/2000 | Baumoel | ................. | G01F 1/662 73/861.27 |
| 6,305,233 B1 * | 10/2001 | Braathen | ................. | G01S 7/527 73/861.27 |

(Continued)

FOREIGN PATENT DOCUMENTS

| DE | 19818053 A1 | 10/1998 |
|---|---|---|
| DE | 19841154 A1 | 4/2000 |

(Continued)

*Primary Examiner* — Matthew G Marini
(74) *Attorney, Agent, or Firm* — Laurence A. Greenberg; Werner H. Stemer; Ralph E. Locher

(57) ABSTRACT

A method for determining the time of flight, preferably the absolute time of flight, of an ultrasound signal in a flowing medium, includes using an ultrasound emitter to generate an ultrasound signal provided with a marker. The ultrasound signal is transmitted through the flowing medium to an ultrasound receiver, and the location of the marker is used in order to determine the time of flight of the ultrasound signal. The period duration of at least one selected period of the reception signal is measured to determine the location of the marker. An ultrasonic flow meter which can be operated according to the method is also provided.

14 Claims, 5 Drawing Sheets

(56) References Cited

U.S. PATENT DOCUMENTS

| | | | |
|---|---|---|---|
| 6,435,038 B1 | 8/2002 | Nam | |
| 2009/0173166 A1* | 7/2009 | Genosar | G01F 1/708 73/861.05 |
| 2011/0282596 A1 | 11/2011 | Patel et al. | |
| 2018/0149505 A1 | 5/2018 | Ploss et al. | |

FOREIGN PATENT DOCUMENTS

| | | | | |
|---|---|---|---|---|
| DE | 102009046562 A1 | | 5/2011 | |
| DE | 202011005427 U1 | | 7/2012 | |
| DE | 102014102677 A1 | * | 9/2014 | ............ H04W 36/02 |
| WO | 2016184709 A1 | | 11/2016 | |

* cited by examiner

METHOD FOR DETERMINING THE TIME OF FLIGHT OF AN ULTRASOUND SIGNAL IN A FLOWING MEDIUM AND ULTRASONIC FLOW METER

CROSS-REFERENCE TO RELATED APPLICATION

This application claims the priority, under 35 U.S.C. § 119, of German Patent Applications DE 10 2017 011 145.6, filed Dec. 1, 2017 and DE 10 2017 011 861.2, filed Dec. 21, 2017; the prior applications are herewith incorporated by reference in their entirety.

BACKGROUND OF THE INVENTION

Field of the Invention

The invention relates to a method for determining the time of flight of an ultrasound signal in a flowing medium, wherein an ultrasound signal provided with a marker is generated by an ultrasound emitter, the ultrasound signal is transmitted through the flowing medium to an ultrasound receiver, and the location of the marker is used in order to determine the time of flight of the ultrasound signal. The invention also relates to an ultrasonic flow meter to be operated according to the method.

In order to measure the flow of a flowing medium in generic ultrasonic flow meters the times of flight of sound waves, or ultrasound waves, are measured. The times of flight are measured either as an absolute time of flight or as a difference in relation to a reference time of flight.

In the simplest case, in difference-in-time-of-flight methods, the difference in time of flight of the ultrasound waves is determined by measuring the phase shift of the ultrasound waves between the emission signal and the reception signal. In that case, a first signal is sent through the medium in the opposite direction to a second signal in relation to the flow direction of the medium. The measurable time-of-flight differences are, however, limited in that case because of the periodic repetition of the phase angle. It is therefore not possible to measure time-of-flight differences which are greater than the period of duration of the signal frequency being used. There are therefore limits in that case which should not be crossed so as to prevent an ambiguity which can no longer be resolved in the signals. In the case of large flows, that may lead to problems. Furthermore, the absolute time of flight of the ultrasound waves cannot be measured in that way. In addition, the time of flight of an ultrasound signal in a fluid is dependent on the temperature of the fluid. The need may therefore arise to record the fluid temperature, for example by using a temperature sensor, and to include it in the determination of the flow quantity.

For absolute time-of-flight measurement, so-called level and envelope curve methods are conventionally used. In order to obtain reliable measurements in that way however, very complex implementation is required. To that end, implementations are usually carried out by using so-called ASICs (Application Specific Integrated Circuits).

Description of the Related Art

One method for determining the absolute time of flight of an ultrasound signal in a flowing medium is known from German Publication DE 198 18 053 A1, corresponding to U.S. Pat. No. 6,062,091. A marker in the ultrasound signal is used in order to detect the actual arrival time of the leading edge of the signal. The marker is a phase-change marker, which is recorded in the reception signal by detecting the phase change.

Another method for determining the absolute time of flight of an ultrasound signal in a flowing medium is known from German Utility Model DE 20 2011 005 427 U1. In that case, no marker is embedded in the ultrasound signal. For absolute time allocation between the emitted and received ultrasound signals, the pulse width of the first wave of a received reception wave train is recorded at a predetermined threshold, which is not equal to the zero crossings.

SUMMARY OF THE INVENTION

It is accordingly an object of the invention to provide a method for determining the time of flight of an ultrasound signal in a flowing medium and an ultrasonic flow meter, which overcome the hereinafore-mentioned disadvantages of the heretofore-known methods and devices of this general type and in which the absolute time-of-flight determination of ultrasound signals is improved, with a reduced measurement outlay at the same time.

With the foregoing and other objects in view there is provided, in accordance with the invention, in order to determine the time of flight, preferably the absolute time of flight, of an ultrasound signal in a flowing medium, an ultrasound signal provided with a marker is provided, which is generated by an ultrasound emitter. Subsequently, the ultrasound signal is transmitted through the flowing medium to an ultrasound receiver, where the location of the marker is used in order to determine the time of flight of the ultrasound signal by measuring the period duration of at least one selected period of the reception signal in order to determine the location of the marker. The embedding of a marker into the ultrasound signal may lead to a difference in the period duration. If a difference in the period duration is registered when measuring the reception signal, the location of the marker can thereby be deduced. For example, the instant at which the marker was embedded into the ultrasound signal may be known. On the basis of this instant, the time until registration of the marker in the reception signal may be measured. The effect thereby achieved is that the method can be carried out with less technical outlay. The ultrasound emitter or receiver may respectively be in contact with the flowing medium, preferably located directly in the medium. For the described method, advantageously no specialized microcontrollers are needed in order to generate the required emission signal. Simply generated emission signals may therefore be used, which make do without special peripherals, for example digitally controlled oscillators.

Expediently, in order to receive the reception signal, a reception window having a known location is opened. The location of the reception window may be established as a function of the location of the selected period of the reception signal. The determination of the location of the marker may therefore advantageously include the determination of the position of the selected period in relation to the position of the reception window. Thus, the location of the reception window may for example be adapted, for example in order to ensure that the reception signal lies in the reception window over a large measurement range. Furthermore, for example, the temporal extent may be adapted so that the marker, or the selected period, may lie fully in the reception window. Thus, it may be expedient for the reception window to include at least two full wave periods. Preferably, the reception window may include two to three full wave periods, with the advantage that detection of the marker or of the complete selected period is ensured, but at the same time the energy consumption is limited.

Advantageously, a plurality of reception signals may be generated with the aid of a plurality of ultrasound signals, so that the possibility exists of displacing the position of the reception window until the marker of at least one of the reception signals lies inside the reception window. This provides the advantage that the position of the reception window can be optimized in a straightforward way, so that this is at the same time accompanied by signal optimization.

An additional displacement of the reception window as a function of the quality of the reception signal achieves the advantage that further optimization of the signal takes place. Thus, the marker may still lie inside the reception window after the additional displacement. This provides the possibility of displacing the reception window relative to the marker which has been found. For example, the reception window may therefore be aligned with a large amplitude in the reception signal, with the marker lying for example at the edge of the reception window. Furthermore, the marker may lie outside the reception window after the additional displacement. In this case, the relative position of the reception window in relation to the marker is expediently always known. However, optimal alignment of the reception window may therefore advantageously take place. For example, the alignment, for example with a large amplitude in the reception signal, may take place without the restriction that the marker would have to lie inside the reception window.

In one refinement of the invention, it is possible to provide as further method steps that a second ultrasound signal, provided without a marker, is generated by the ultrasound emitter, subsequently transmitted through the flowing medium to the ultrasound receiver and detected at the ultrasound receiver, with the location of the marker being determined from a comparison of the period durations of selected periods of the first ultrasound signal with a marker and of the second ultrasound signal without a marker. Advantageously, the difference in the period durations of the first and second reception signals may be significantly more than the system-related measurement noise, so that the outlay for detection of the marker is reduced. In this case, the chronological order of the first and second ultrasound signals may be unimportant, i.e. for the method it may be insignificant whether a signal with or without a marker is emitted first. Furthermore, the need for additional hardware outlay can be avoided, which makes the method economical. Thus, the already installed hardware of devices, for example of ultrasonic flow meters, may be used. Furthermore, the method may also be combined with measurement circuits, for example for the time-of-flight measurement of ultrasound signals, which are already present in such devices. The switching over of the measurement circuits may, for example, be carried out by the logic cells present in a PIC microcontroller. Such circuits may furthermore also be produced with external gates.

It is particularly expedient for the first and second ultrasound signals to have the same frequency. The identification of the marker can therefore be facilitated, since the comparison of equivalent points in the reception signal is simplified. The period durations of the first and second ultrasound signals may advantageously be identical for all reception periods before the embedding of the marker into the first ultrasound signal.

By using a difference between the ultrasound signals detected with a marker and without a marker for time allocation of the emitted ultrasound signals to the received ultrasound signals, the additional advantage is obtained that the absolute time of flight can be determined more efficiently and more reliably. As soon as the period duration of equivalent periods of the first and second ultrasound signals differ from one another, this may be attributed to the embedded marker. The number of measurements required is reduced significantly, which at the same time reduces the energy consumption.

Advantageously, the ultrasound signals with and without a marker may be emitted in the same direction in relation to the flow direction of the flowing medium. In contrast to the measurement of time-of-flight differences, for measurement of the absolute time of flight it is not necessary to send ultrasound signals through the flowing medium in opposite directions. It is therefore advantageously possible to achieve the effect that no limitation of the measurable time of flight occurs. In contrast thereto, in the case of forward and backward measurements in opposite directions in relation to the flow direction, there is an absolute limit on the time-of-flight difference which can be evaluated. The absolute limit results because of ambiguities in the signals which can no longer be resolved, and which no longer permit correct measurement. However, in order to make measurement of the absolute time of flight more robust in relation to erroneous detections, there is still the possibility of repeating the entire measurement process of the two ultrasound signals with and without a marker by emitting the two ultrasound signals again in the opposite direction.

The ultrasound signals advantageously include a plurality of periods (wave periods). It is therefore possible to select at least one period and determine its period duration. For example, a transient phase may be defined, in which for example the amplitude has not yet reached its maximum value. For the measurement of the period duration, it is correspondingly possible to wait for an instant after the transient phase. The marker may therefore be determined more reliably, since the position of the marker is more clearly identifiable by a change in the period duration.

By setting the marker after an $N^{th}$ period, the measured period durations of the signals with and without a marker can be identical up to the $N^{th}$ period. From the $N+1^{th}$ period onwards, the period durations of the signals with and without a marker differ from one another.

Expediently, the location of the received wave period is determined by the difference in the period durations between the $N^{th}$ and $N+1^{th}$ period. Advantageously, the difference in the period durations in the case of the ultrasound transducers used for the method may lie significantly above the system-related measurement noise, which permit unique determination of the transition from the $N^{th}$ to $N+1^{th}$ periods.

By initially determining possible positions of the reception window, and repeating the method for a multiplicity of the possible positions of the reception window, the determination of the absolute time of flight of an ultrasound signal can be carried out more efficiently. For the initial position determination, the technically possible positions of the reception window may expediently be determined. To this end, for example, physical parameters, for example the minimum and/or maximum temperature and/or consistency of the flowing medium and/or the measurement section length between the ultrasound emitter and the ultrasound receiver may be taken into account. Furthermore, if there are temperature sensors in the measurement system, the possible search range may be further restricted by also taking into account the measurement tolerances of the temperature sensor. This method step may include a plurality of individual measurements, since it is possible to repeat the method for determining the absolute time of flight at a multiplicity of the possible positions of the reception window. Furthermore, the period durations may depend strongly on the transducer characteristics of the ultrasound transducers used for the method. Furthermore, the period durations may also, for example, change because of variation of temperature and/or pressure. The initial position determination of the reception window also offers the possibility of taking into account varying parameters of the flowing medium, and of calibrating the expected period durations autonomously in the device, particularly in the ultrasound flow meter.

In another configuration of the method, the marker may include a phase change of the ultrasound signal. A phase change may for example include inversion of the phase of the emission signal, or for example a phase jump. For example, a phase lead or a phase lag at a position may be embedded into the ultrasound signal.

Advantageously, a characteristic period duration may be measured for verification of the position of the reception window. A characteristic period duration of a period may be distinguished in that the period duration is as unique as possible and is furthermore different from the neighboring periods. If there is only a slight difference of the measured period duration from the expected or previously measured period duration, correct positioning of the reception window may still be assumed. Regarding the need for complete redetermination of the reception window, it is therefore possible to decide in a straightforward way in order to avoid unnecessary expenditure of time and energy consumption.

Advantageously, the period duration of a period of the received ultrasound signals may be measured by using a single measurement, so that the flow noise has no influence on the measurement values. This has the advantage that the measurement is significantly lower in noise, for which reason the time of flight can be determined substantially more accurately. Furthermore, the number of measurements required can therefore be decreased, so that the energy consumption can be reduced.

The speed of sound has a high temperature dependency in the medium, in particular water. By measuring the absolute time of flight of the ultrasound signals, the advantage is obtained that additional temperature measurement values can be obviated. In an ultrasonic flow meter in which the method is carried out, a temperature sensor can therefore be obviated, which can reduce the technical outlay and the costs.

With the objects of the invention in view, there is concomitantly provided an ultrasonic flow meter. The ultrasonic flow meter according to the invention can be operated according to at least one of the method claims. Thus, the ultrasonic flow meter may expediently include a housing with an inlet and an outlet. Furthermore, it may be particularly expedient for the ultrasonic flow meter to include at least one, preferably two, ultrasound transducers. The transducers may be in contact with the medium, preferably located directly in the medium. In order to establish the position of the measurement section inside the flowing medium, it is possible to place reflectors inside the flowing medium. The orientation of the measurement section with respect to the flow direction of the flowing medium may in this case be selected according to the configuration of the method.

Other features which are considered as characteristic for the invention are set forth in the appended claims.

Although the invention is illustrated and described herein as embodied in a method for determining the time of flight of an ultrasound signal in a flowing medium and an ultrasonic flow meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
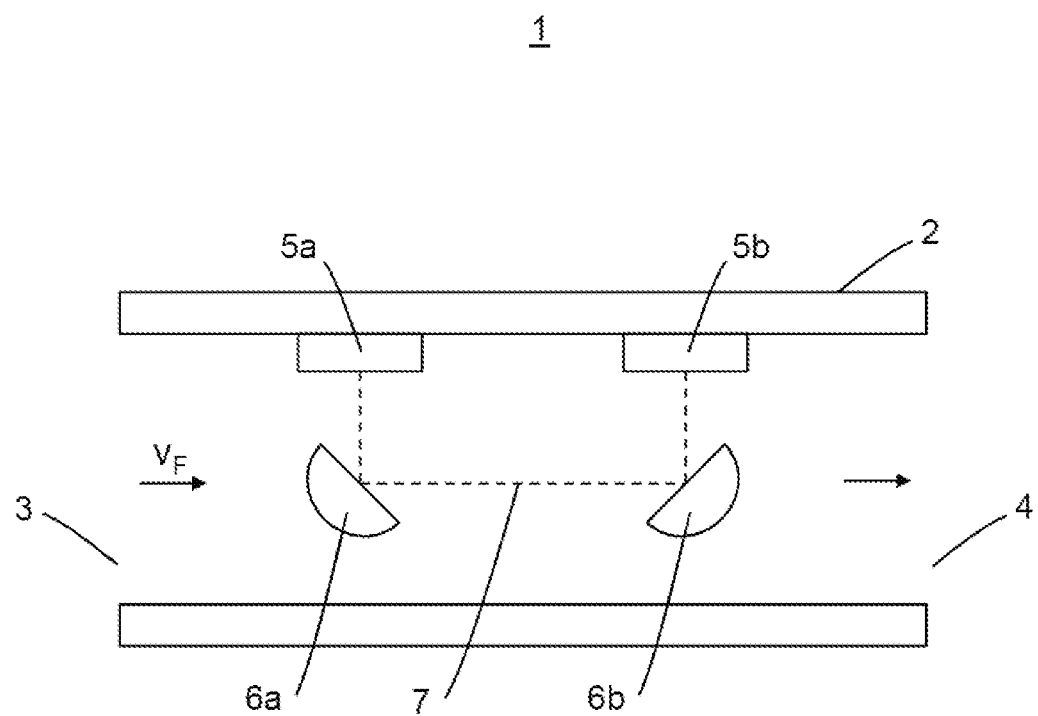
FIG. 1 is a highly simplified representation of a basic ultrasonic flow meter.

Referring now to the figures of the drawings in detail and first, particularly, to FIG. 1 thereof, there is seen a basic ultrasonic flow meter 1. A housing 2 has an inlet 3 and an outlet 4. The flow direction of the flowing medium is shown by the arrows at the inlet 3 and outlet 4. The medium flows, for example, with a flow rate $v_F$. A measuring instrument of the ultrasonic flow meter 1 is represented by way of example with two ultrasound transducers 5a and 5b. The ultrasound transducers 5a and 5b are in contact with the flowing medium. A path of ultrasound signals 10a and 11a is deflected at respective reflectors 6a and 6b, for example into a U-shaped measurement section 7. A part of the measurement section 7 extends parallel to the flow direction of the flowing medium. Ultrasound signals 11a with and 10a without a marker 12 may both be emitted in the same direction in relation to the flow direction of the flowing medium, i.e. by the same ultrasound transducer 5a or 5b.

Figure 2A:
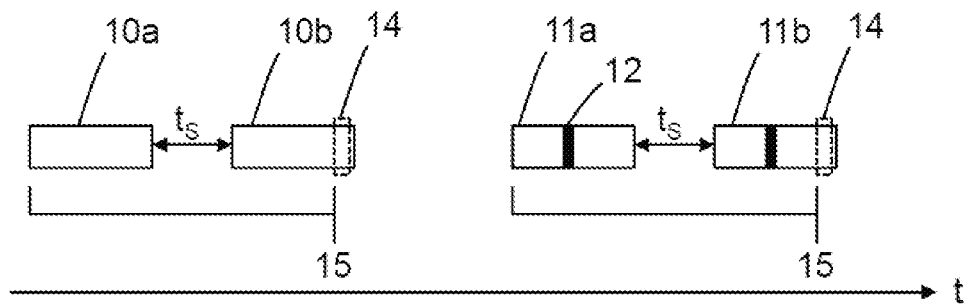
FIGS. 2A-C are exemplary representations of a determination of a reception window.
Figure 2B:
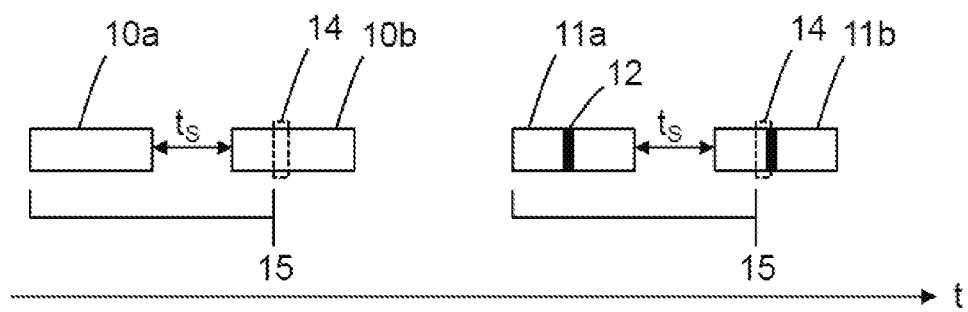
Figure 2C:
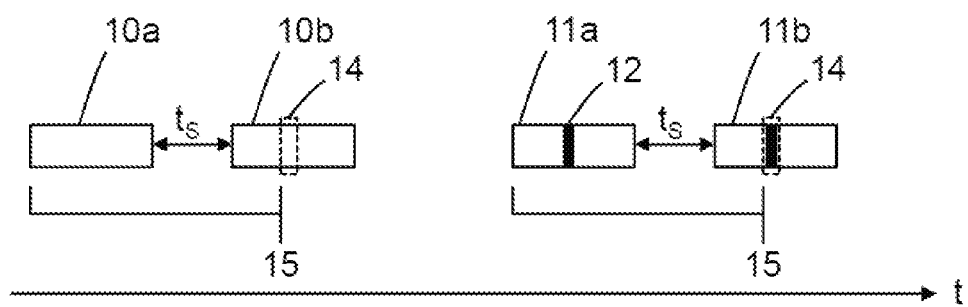

An example of determination of a starting position 15 of a reception window 14 is represented in FIGS. 2A-C. For the initial position determination, the method requires a plurality of individual measurements. To this end, the technically possible positions 15 of the reception window 14 are initially determined. For example, physical parameters, for example the medium temperature and/or the measurement section length, are in this case taken into account. Subsequently, for a multiplicity of the possible positions 15 of the reception window 14, two successive measurements are respectively carried out in the same direction in relation to the flow direction of the flowing medium. The first of the two successive submeasurements uses the signal 10a without a marker. For the second submeasurement, a signal 11a with the same frequency as the first submeasurement is used. However, the signal 11a of the second submeasurement is provided with a marker 12. The marker 12 may in this case include a phase change of the ultrasound signal 11a. Thus, for example, the phase of the emission signal 11a may be inverted after a particular $N^{th}$ emitted period, for example the $6^{th}$ period. The two ultrasound signals 10a and 11a in this case include a multiplicity of periods.

FIG. 2A shows by way of example a first order of two successive measurements. First, to this end, a first signal 10a without a marker is emitted. For the distance from one ultrasound transducer 5a to the other ultrasound transducer 5b, the ultrasound signal 10a requires a time $t_s$. This time $t_s$ depends inter alia on the medium temperature and/or medium consistency and/or the length of the measurement section 7. The first signal 10a without a marker could therefore be received at the second ultrasound transducer 5b as a reception signal 10b after the time $t_s$, so long as a reception window 14 has also correspondingly been opened. After the first signal 10a without a marker, a second signal 11a with a marker 12 is emitted. This could likewise be received as a reception signal 11b with a marker 12 after the time $t_s$. The reception window 14 is positioned at too late a time for the marker 12 of the second signal 11b with a marker 12 in FIG. 2A, so that the marker 12 does not fall within the reception window 14. The time length of the reception window 14 may expediently be longer than a period duration of the reception signals 10b, 11b. Otherwise, a part of the period could be truncated. In order to ensure that a full period of the reception signals 10b, 11b falls within the reception window 14, the reception window 14 may advantageously have a width of two period durations. For example, the reception window 14 may be opened for 2 μs. The emission and reception signals 10a, 11a, 10b, 11b with and without a marker are identical from the start until the position of the marker 12. The time difference between the emission of the first signal 10a and of the second signal 11a may expediently be selected in such a way that it is possible to differentiate between the received signals 10b and 11b. Thus, for example, the possibility exists of emitting the second signal 11a only once the reception window 14 for the first signal 10b has been closed.

The position 15 of the reception window 14 is displaced until the marker 12, which represents a characteristic change in the period duration, is reached. The initial position 15 of the reception window 14 in FIG. 2B is at an earlier instant in relation to the emission instants of the ultrasound signals 10a and 11a. The time $t_s$, which an ultrasound signal takes from one ultrasound transducer 5a to the other ultrasound transducer 5b is unchanged in this example, since for example no change in the volume flow and/or the temperature has occurred. In this example, however, the position 15 of the reception window 14 is selected too early in relation to the position of the marker 12. Although for example a part of the period provided with the marker 12 may fall within the reception window 14, unique determination of the position of the marker 12 cannot however thereby be carried out, or errors may occur in the determination of the time of flight.

In order to improve the position 15 of the reception window 14 in relation to the marker 12, for example, the position 15 of the reception window 14 is optimized so that the marker 12 lies in the middle, or as centrally as possible in relation to the temporal extent of the reception window 14. Expediently, the entire period of the marker 12 lies inside the reception window 14. This optimization may, for example, be done by iterative displacement of the reception window 14 about the supposed position of the marker 12. FIG. 2C shows a correspondingly optimized position 15 of the reception window 14. The optimal location of the reception window 14 can thus be determined by using individual measurements. Advantageously, the signals in the corresponding reception windows 14 of the reception signals 10b, 11b with and without a marker may be compared in order to simplify the detection of the marker 12. As soon as the location of the marker 12 and therefore the position 15 of the reception window 14 in relation to the emission and reception signals 10a, 10b, 11a, 11b with and without a marker are known, the possibility exists of displacing the reception window 14 to another position. Any desired position inside the reception signals 10b, 11b with and/or without a marker, which is different from the position of the marker 12, may be therefore used for the determination of the time of flight, and therefore for the flow measurement of the flowing medium. For example, the reception window 14 may be displaced from the position of the marker 12 by two periods. It is therefore possible to switch over in a straightforward way between the position for the detection of the marker 12 and the position for the flow measurement. In order to verify the position 15 of the reception window 14 during the flow measurement, it is advantageously possible to switch over to the known, already determined position of the marker 12 and to measure the period of the marker 12 as a characteristic period duration. If the characteristic period duration corresponds to the already determined period duration of the marker 12, no new determination of the position 15 of the reception window 14 is necessary.

Figure 3A:
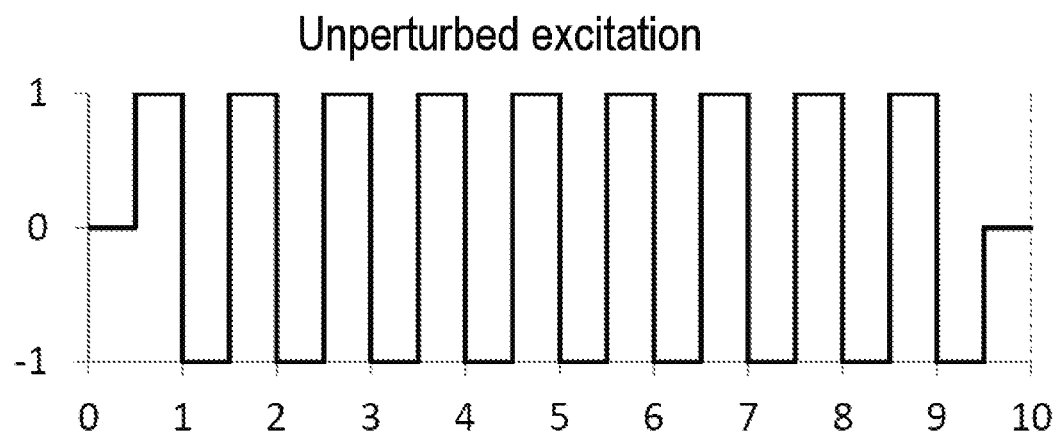
FIGS. 3A-D are exemplary representations of possible excitation signals with and without a marker.

Possible exemplary representations of excitation signals, with which the ultrasound transducer 5a or 5b is operated in order to generate respective ultrasound signals 10a and 11a without and with a marker, are shown in FIGS. 3A-D. An exemplary representation of the excitation of an ultrasound transducer 5a or 5b without setting a marker is shown in FIG. 3A. The excitation in this case is carried out by using a square-wave signal. The y axis shows the excitation amplitude with arbitrary units. The corresponding periods are entered chronologically on the x axis.

Figure 3B:
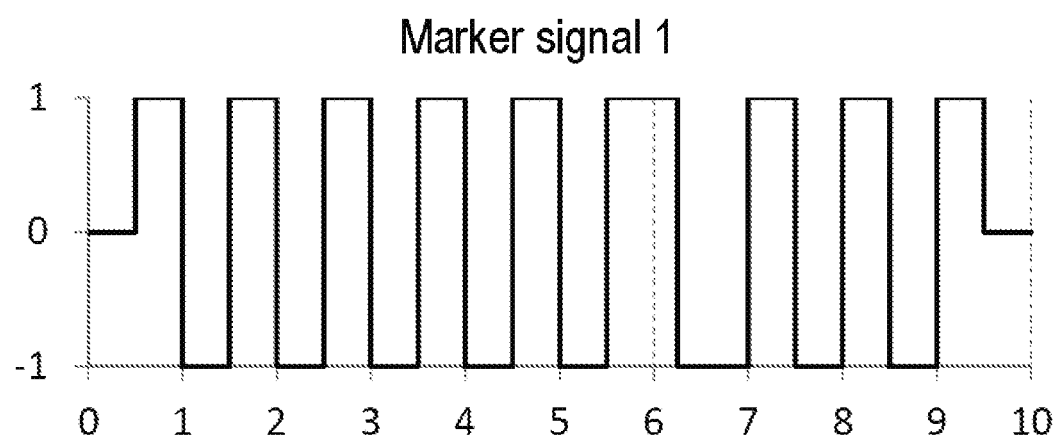
Figure 3C:
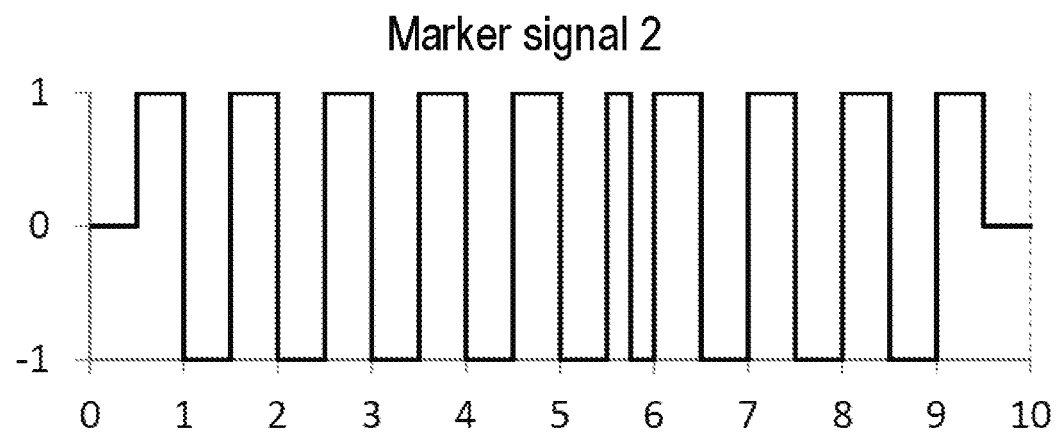
Figure 3D:
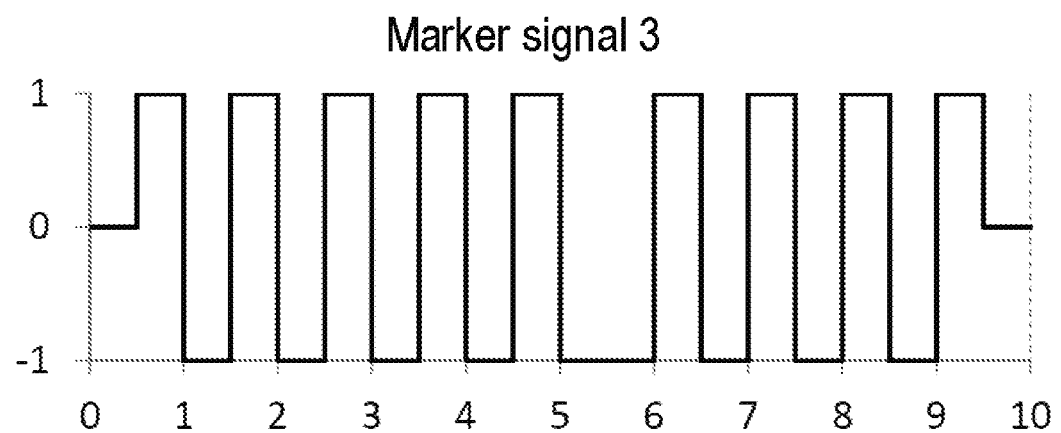

FIGS. 3B to 3D show excitation signals with a marker 12, each of which signals has an exemplary perturbation. The markers 12 in the emitted ultrasound signal 11a are, for example, defined by these perturbations in the excitation signal. The perturbations are selected in such a way that, for example, inversion of the phase of the emission signal 11a takes place after the $6^{th}$ emitted period. The perturbation in FIG. 3B is for example, an extended excitation of the $6^{th}$ period and delay of the excitation for the $7^{th}$ period. In FIG. 3C, the perturbation is configured as a shortened excitation of the $6^{th}$ period. After the $6^{th}$ period, the phase of the emission signal 11a is inverted. In FIG. 3D, the perturbation is such that the excitation signal for the $6^{th}$ period is delayed. From the $7^{th}$ period onwards, the phase of the emission signal 11a is inverted in this case as well.

Figure 4:
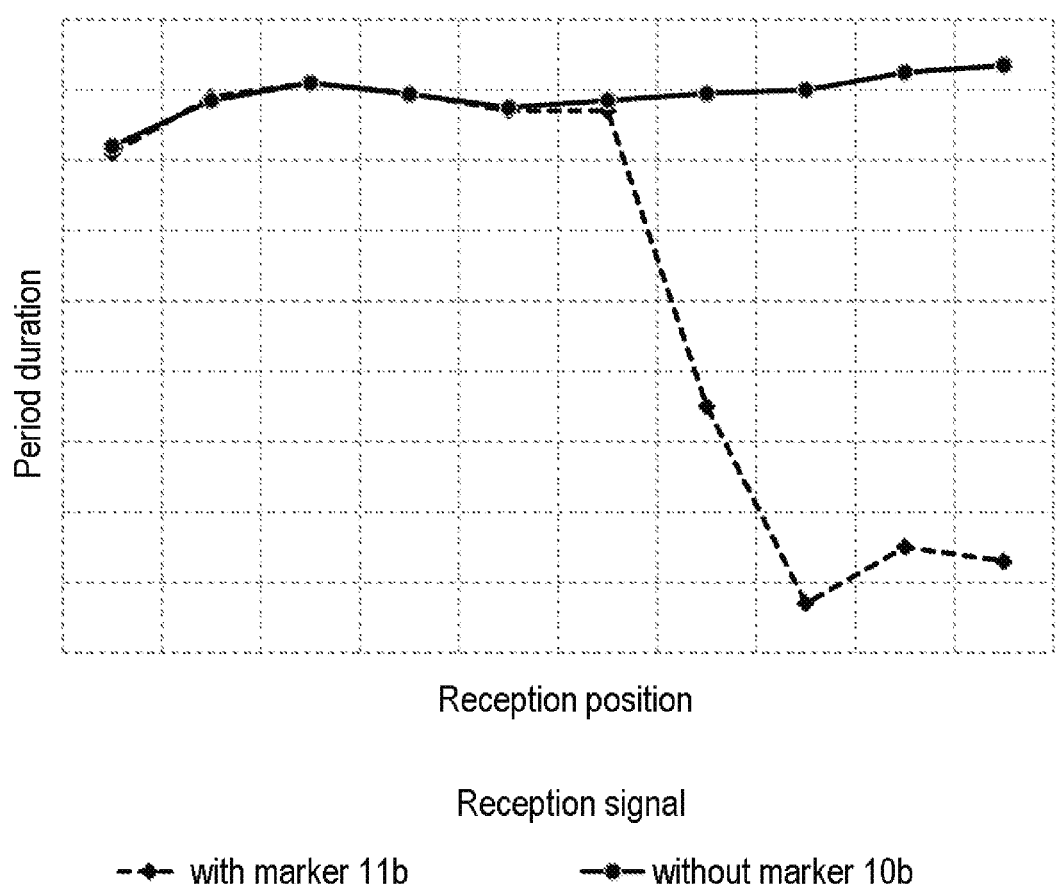
FIG. 4 is an exemplary representation of a comparison of period durations between a signal with a marker and a signal without a marker.

FIG. 4 represents by way of example the comparison of the period durations between a received signal with a marker 11b and a received signal without a marker 10b. Each point represents the period duration of a particular period in the respective signal 11b or 10b. In order to determine the absolute time of flight, a first signal with a marker 11b and a second signal with the same frequency without a marker 10b are used. The period durations may be subjected to variations, which are for example caused by temperature influences and/or transient processes. For comparison of the two signals 11b and 10b, the period durations are for example determined at equivalent points. The measurement of the period duration may, for example, in this case be carried out on a positive leading edge of the reception signals 11b or 10b. By way of example, in FIG. 4 the marker 12 has been set after the $6^{th}$ emitted period. The measured period durations of the respective reception signals with and without a marker 11b and 10b are identical for the reception periods 1 to 6. From the $7^{th}$ period onwards, the measured period durations of the reception signals 11b and 10b differ. It is therefore possible to determine the position of the $6^{th}$ or $7^{th}$ reception period according to the position 15 of the reception window 14 (see FIGS. 2A-2C). If the position of the transition from the $6^{th}$ to the $7^{th}$ reception period lies chronologically at the start of the reception window 14, the reception window 14 is opened at an earlier time during the subsequent measurement in order to center the received signals 11b and 10b in the reception window. In a similar way to this, the reception window 14 is opened at a later time in the following measurement if the position of the transition from the $6^{th}$ to the $7^{th}$ reception period lies chronologically at the end of the reception window 14. The absolute time of flight of the ultrasound signals 11b and 10b can therefore be determined by determination of the marker 12.

The following is a summary list of reference numerals and the corresponding structure used in the above description of the invention:

1 ultrasonic flow meter
2 housing
3 inlet
4 outlet
5a, 5b ultrasound transducer
6a, 6b reflector
7 measurement section
10a emission signal without marker
10b reception signal without marker
11a emission signal with marker
11b reception signal with marker
12 marker
14 reception window
15 position of the reception window

The invention claimed is:

1. A method for determining a time of flight of an ultrasound signal in a flowing medium, the method comprising the following steps:
   using an ultrasound emitter to generate a plurality of ultrasound signals provided with a marker, the ultrasound signals having a plurality of wave periods;
   transmitting the plurality of ultrasound signals through the flowing medium to an ultrasound receiver;
   opening a reception window to receive a reception signal of a plurality of reception signals generated by using the plurality of ultrasound signals, the reception window having a width of two to three wave period durations;
   the marker being embedded into the ultrasound signal at a known instant after an $N^{th}$ wave period, the embedding of the marker into the ultrasound signal leading to differences in the wave period durations of the ultrasound signals with and without the marker from an $N+1^{th}$ wave period onwards;
   measuring the wave period duration of at least one selected wave period of the reception signal and using the measured wave period to determine a location of the marker, the location of the marker being determined upon registering a difference of the wave period durations of the reception signals;
   displacing a position of the reception window until the marker of at least one of the reception signals lies inside the reception window;
   determining a location of the reception window in dependence on a location of the at least one selected wave period of the reception signal;
   measuring a time until registration of the marker in the reception signal based on the known instant of the embedding of the marker; and
   using the location of the marker to determine the time of flight of the ultrasound signal.

2. The method according to claim 1, which further comprises additionally carrying out a displacement of the reception window as a function of a quality of the reception signal.

3. The method according to claim 1, which further comprises:
   using the ultrasound emitter to generate another ultrasound signal provided without a marker;
   transmitting the other ultrasound signal through the flowing medium to the ultrasound receiver and detecting the other ultrasound signal at the ultrasound receiver; and
   determining the location of the marker from a comparison of wave period durations of selected wave periods of the ultrasound signal with a marker and the other ultrasound signal without a marker.

4. The method according to claim 3, which further comprises providing the ultrasound signals with a marker and without a marker with an identical frequency.

5. The method according to claim 3, which further comprises using a difference between the ultrasound signals detected with and without a marker for allocating the emitted ultrasound signals to the received ultrasound signals.

6. The method according to claim 3, which further comprises emitting the ultrasound signals with and without a marker in an identical direction relative to a flow direction of the flowing medium.

7. The method according to claim 3, which further comprises providing the ultrasound signals with a plurality of wave periods.

8. The method according to claim 1, which further comprises determining a location of a received wave period by using a difference in a period duration between the $N^{th}$ and the $N+1^{th}$ wave period.

9. The method according to claim 1, which further comprises determining possible positions of the reception window, and repeating the method for a multiplicity of the possible positions of the reception window.

10. The method according to claim 9, which further comprises measuring a characteristic wave-period duration for verification of the position of the reception window.

11. The method according to claim 9, which further comprises measuring a period duration of a wave period of the received ultrasound signals by using a single measurement.

12. The method according to claim 1, which further comprises including a phase change of the ultrasound signal in the marker.

13. The method according to claim 1, which further comprises determining an absolute time of flight of the ultrasound signals.

14. An ultrasonic flow meter, comprising:
   an ultrasound emitter for generating a plurality of ultrasound signals having a plurality of wave periods and being provided with a marker embedded into the ultrasound signal at a known instant after an $N^{th}$ wave period, the marker embedded into the ultrasound signal leading to differences in wave period durations of the ultrasound signals with and without the marker from an $N+1^{th}$ wave period onwards;
   an ultrasound receiver for receiving the plurality of ultrasound signals transmitted through a flowing medium; and
   said ultrasound emitter and receiver measuring the wave period duration of at least one selected wave period of a reception signal of a plurality of reception signals, the plurality of reception signals to be generated by using the plurality of ultrasound signals and to be received at an open reception window having a width of two to three wave period durations:
to displace a position of the reception window until the marker of at least one of the reception signals lies inside the reception window,
to determine a location of the reception window in dependence on a location of said at least one selected wave period of the reception signal,
to measure a time until registration of the marker in the reception signal based on the known instant of the embedding of the marker, and
to use the measured wave period to determine a location of the marker used for determining a time of flight of the ultrasound signal, the location of the marker being determined upon registering a difference of the wave period durations of the reception signals.

\* \* \* \* \*